(12) United States Patent
Zhang et al.

(10) Patent No.: US 10,631,219 B2
(45) Date of Patent: Apr. 21, 2020

(54) ENHANCED VHF LINK COMMUNICATIONS METHOD

(71) Applicants: Honeywell International Inc., Morris Plains, NJ (US); Yilong Zhang, Beijing (CN); Haiping Chen, Beijing (CN)

(72) Inventors: Yilong Zhang, Beijing (CN); Haiping Chen, Beijing (CN)

(73) Assignee: Honeywell International Inc., Morris Plains, NJ (US)

( * ) Notice: Subject to any disclaimer, the term of this patent is extended or adjusted under 35 U.S.C. 154(b) by 76 days.

(21) Appl. No.: 15/547,249

(22) PCT Filed: Mar. 2, 2016

(86) PCT No.: PCT/CN2016/075320
§ 371 (c)(1),
(2) Date: Jul. 28, 2017

(87) PCT Pub. No.: WO2017/147818
PCT Pub. Date: Sep. 8, 2017

(65) Prior Publication Data
US 2018/0124671 A1 May 3, 2018

(51) Int. Cl.
*H04W 4/00* (2018.01)
*H04W 36/18* (2009.01)
(Continued)

(52) U.S. Cl.
CPC ........ *H04W 36/18* (2013.01); *H04B 7/18506* (2013.01); *H04W 36/08* (2013.01);
(Continued)

(58) Field of Classification Search
CPC ............ H04B 7/18506; H04W 84/005; H04W 36/14; H04W 36/30
See application file for complete search history.

(56) References Cited

U.S. PATENT DOCUMENTS 7,113,780 B2 * 9/2006 McKenna .............. H01Q 1/007
455/431
7,313,398 B1 12/2007 Ramahi
(Continued)

FOREIGN PATENT DOCUMENTS

| CN | 1618187 | 5/2005 |
|----|---------|--------|
| CN | 104617999 | 5/2015 |
| WO | 0147126 | 6/2001 |

OTHER PUBLICATIONS

International Searching Authority, "International Search Report & Written Opinion from PCT Application No. PCT/CN2016/075320 dated Nov. 18, 2016", dated Nov. 18, 2016, pp. 1-12.
(Continued)

*Primary Examiner* — Shantell L Heiber
(74) *Attorney, Agent, or Firm* — Fogg & Powers LLC

(57) ABSTRACT

A communication system onboard an aircraft includes: a first multi-frequency transceiver coupled to a first antenna; a second multi-frequency transceiver coupled to a second antenna; and at least one processor communicatively coupled to a memory, the first multi-frequency transceiver, and the second multi-frequency transceiver. The at least one processor is configured to: establish a first air-to-ground data communication link with the first multi-frequency transceiver and a first ground station using a first frequency; determine that a handoff from the first frequency to a second frequency is needed, wherein the second frequency is different from the first frequency; and establish a second air-to-ground data communication link with the second multi-frequency transceiver and a second ground station using a second frequency, wherein the first air-to-ground data communication link is maintained until the second air-to-ground data communication link is successfully established.

21 Claims, 6 Drawing Sheets

(51) Int. Cl.
*H04W 36/32* (2009.01)
*H04B 7/185* (2006.01)
*H04W 36/08* (2009.01)
*H04W 64/00* (2009.01)
*H04W 84/00* (2009.01)
*H04W 36/00* (2009.01)
*H04B 1/3822* (2015.01)

(52) U.S. Cl.
CPC ......... *H04W 36/32* (2013.01); *H04W 64/006* (2013.01); *H04B 1/3822* (2013.01); *H04W 36/0009* (2018.08); *H04W 84/005* (2013.01)

(56) References Cited

U.S. PATENT DOCUMENTS

| | | | |
|---|---|---|---|
| 7,605,757 | B1 | 10/2009 | Gribble et al. |
| 8,103,271 | B2 | 1/2012 | Calderhead, Jr. et al. |
| 8,116,796 | B2 | 2/2012 | Boyer et al. |
| 8,374,613 | B2 | 2/2013 | Laroia et al. |
| 8,600,436 | B2 | 12/2013 | Haartsen |
| 8,711,993 | B2 | 4/2014 | Malaga et al. |
| 9,094,087 | B2 | 7/2015 | Malaga |
| 2003/0129982 | A1 | 7/2003 | Perini |
| 2006/0073827 | A1* | 4/2006 | Vaisanen ........... H04W 36/0055 455/436 |
| 2006/0212180 | A1* | 9/2006 | Saffre ................. G08G 5/0013 701/3 |
| 2006/0223573 | A1* | 10/2006 | Jalali ................. H04W 36/0055 455/552.1 |
| 2006/0227898 | A1 | 10/2006 | Gibson et al. |
| 2006/0229029 | A1 | 10/2006 | Waltho et al. |
| 2006/0229104 | A1* | 10/2006 | de La Chapelle .......................... H04B 7/18506 455/562.1 |
| 2008/0102813 | A1* | 5/2008 | Chari ..................... H01Q 1/283 455/424 |
| 2009/0186611 | A1 | 7/2009 | Stiles et al. |
| 2011/0096754 | A1* | 4/2011 | Harris .................. H04W 36/02 370/332 |
| 2012/0021740 | A1* | 1/2012 | Vaidyanathan ...... G08G 5/0013 455/431 |
| 2013/0044611 | A1* | 2/2013 | Jalali ................. H04B 7/18508 370/252 |
| 2013/0150055 | A1 | 6/2013 | Laroia et al. |
| 2014/0029571 | A1 | 1/2014 | Lu et al. |
| 2015/0263781 | A1* | 9/2015 | Pelleschi .................. H04B 1/54 455/527 |
| 2015/0280806 | A1 | 10/2015 | Jalali |
| 2015/0327104 | A1* | 11/2015 | Yiu ....................... H04W 24/10 455/450 |

OTHER PUBLICATIONS

European Patent Office, "Extended European Search Report from EP Application No. 16892009.8 dated Jul. 9, 2019", from Foreign Counterpart to U.S. Appl. No. 15/547,249, pp. 1-10, Published: EP.

* cited by examiner

ENHANCED VHF LINK COMMUNICATIONS METHOD

BACKGROUND

The Aircraft Communications Addressing and Reporting System (ACARS) very high frequency (VHF) link is designed to be a subnetwork used by various entities including aircraft, airlines, air traffic control, and the like for communications. In particular, an ACARS VHF link is used to exchange datalink messages (for example, Air Traffic Control (ATC), Airline Operational Communications (AOC), etc.) between an aircraft and a ground station or other end system equipment.

SUMMARY

In one embodiment, a communication system onboard an aircraft includes: a first multi-frequency transceiver coupled to a first antenna; a second multi-frequency transceiver coupled to a second antenna; and at least one processor communicatively coupled to a memory, the first multi-frequency transceiver, and the second multi-frequency transceiver. The at least one processor is configured to: establish a first air-to-ground data communication link with the first multi-frequency transceiver and a first ground station using a first frequency; determine that a handoff from the first frequency to a second frequency is needed, wherein the second frequency is different from the first frequency; and establish a second air-to-ground data communication link with the second multi-frequency transceiver and a second ground station using a second frequency, wherein the first air-to-ground data communication link is maintained until the second air-to-ground data communication link is successfully established.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
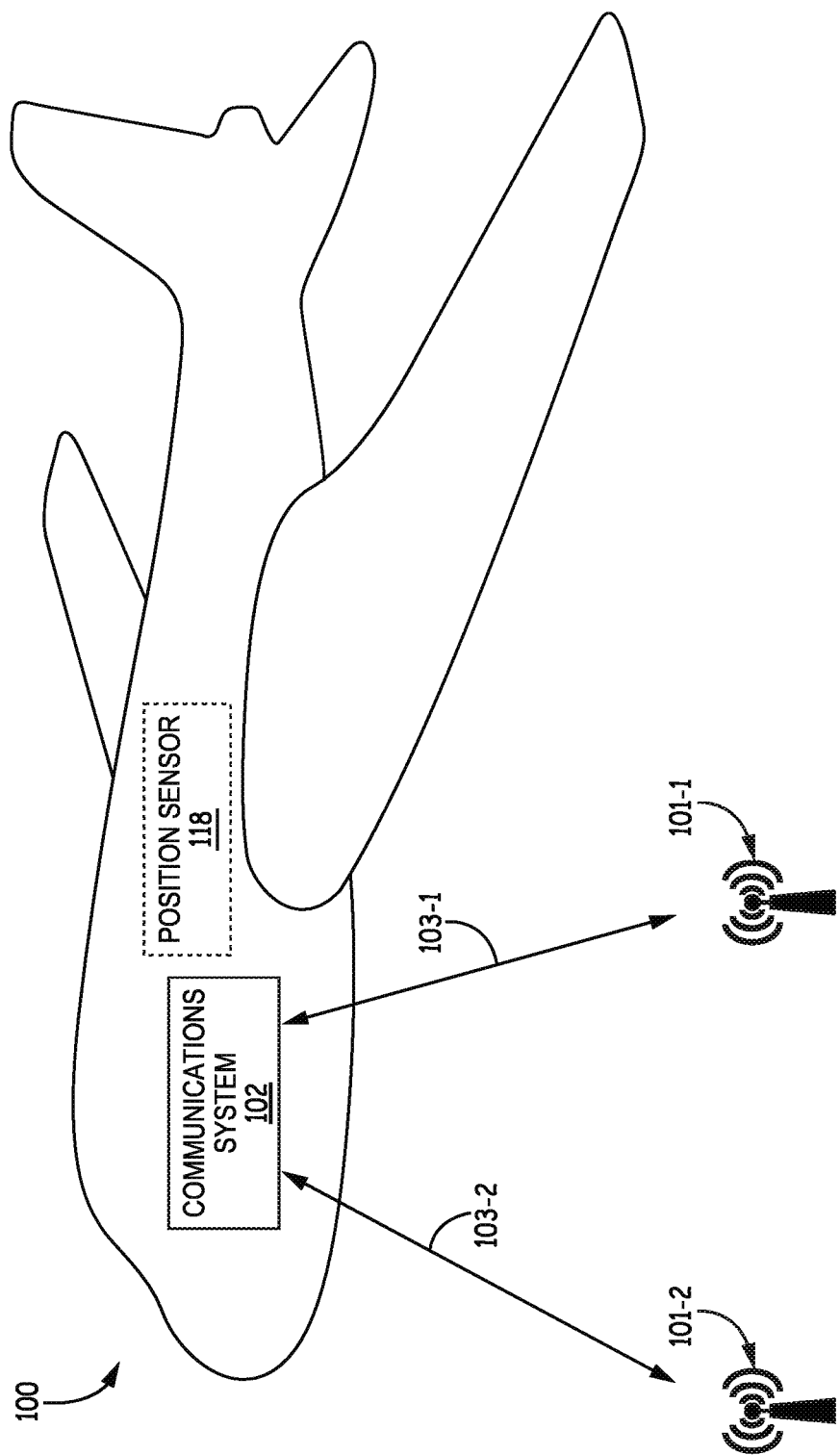
FIGS. 1A and 1B are diagrams illustrating an example communication system for an aircraft according to one embodiment of the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Aircraft commonly include three radios for voice and data communication. In particular, most aircraft include a primary voice radio, a backup voice radio, and a data radio. The data radio uses an ACARS link or other datalink to exchange datalink messages between the aircraft and ground stations. Techniques such as ACARS over Aviation VHF link control (ACARS over AVLC) and Plain old ACARS (POA), only allow for a single VHF link to be established. When this link is broken or disrupted, the Communications Management Unit (CMU) will acquire the next available frequency and try to establish a VHF link using the next available frequency. During the acquisition and establishment phase of this process, datalink messages may be lost and time can be wasted. This scenario also occurs when an aircraft enters a new data region and needs to hand off to a ground station on a different frequency. For the reasons stated above and for other reasons stated below which will become apparent to those skilled in the art upon reading and understanding the specification, there is a need in the art for improved systems and methods for managing air-to-ground data communications.

Embodiments of the present disclosure provide systems and method for managing data communications. Two multi-frequency transceivers are used for data communication links. In particular, a first data communication link is established with one transceiver and a first ground station using a first frequency, and a second data communication link is established with the other transceiver and a second ground station using a different frequency. The second data communication link can be established either before or after a determination that a handoff (used interchangeably herein with handover) is needed. In a handover scenario where a frequency change is required, data communication links are established using both transceivers to enable a soft handover. The systems and methods provide for more efficient handoffs and reduce the likelihood of lost messages when changing frequencies for air-to-ground data communications.

Figure 1B:
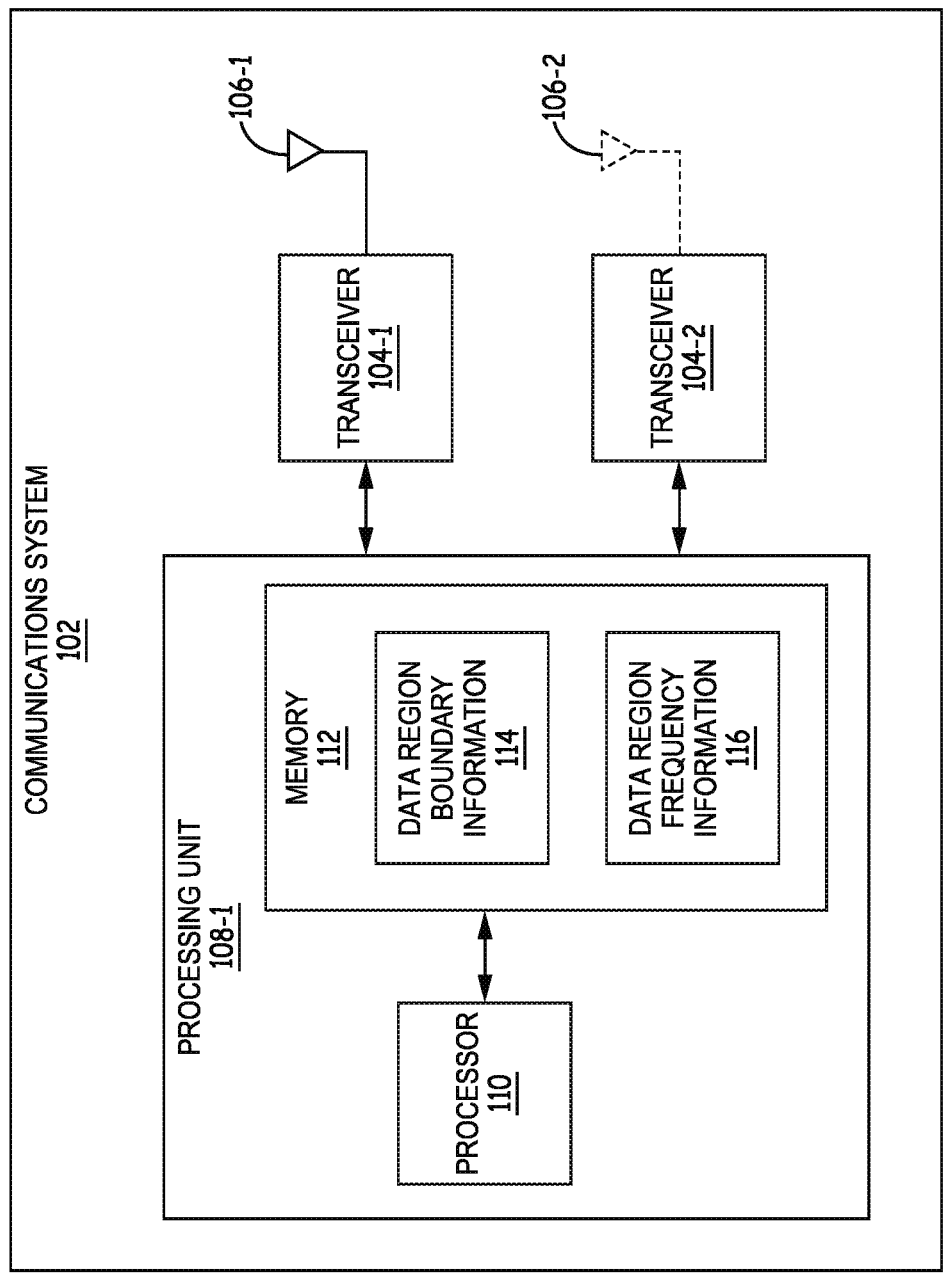

FIGS. 1A and 1B illustrate an example communication system 102 for an aircraft 100 according to one embodiment of the present disclosure. In exemplary embodiments, the aircraft 100 comprises an airplane, a helicopter, a spacecraft, or the like. The communication system 102 includes two or more transceivers 104 (including a first transceiver 104-1, a second transceiver 104-2, and any number of additional optional transceivers 104), at least one antenna 106 (including a first antenna 106-1 and any number of additional optional antennas 106, such as optional second antenna 106-2), and a processing unit 108 (such as the processing unit 108-1).

The transceivers 104 enable bidirectional communication between the aircraft 100 and at least one ground station 101. In exemplary embodiments, individual ground stations 101 can be enabled for either single frequency or multi-frequency communication. Each transceiver 104 is configured to operate using multiple frequencies. In exemplary embodiments, each transceiver 104 comprises a VHF data radio (VDR). In exemplary embodiments, at least one of the transceivers 104 is configured to perform both voice and data communication. In exemplary embodiments, at least two transceivers 104 are configured to perform both voice and data communication. In some embodiments, the transceivers 104 are coupled to the same antenna 106 (such as both transceiver 104-1 and transceiver 104-2 coupled to antenna 106-1 either directly or through an intermediary device such as a power splitter or a switch). In other embodiments, each transceiver is coupled to a respective antenna 106 (such as transceiver 104-1 coupled to antenna 106-1 and transceiver 104-1 coupled to antenna 106-2).

The processing unit 108 includes at least one processor 110 coupled to a memory 112. In exemplary embodiments, the at least one processor 110 implements at least some of the processing described herein. In exemplary embodiments, the at least one processor 110 includes at least one programmable processor, such as a microprocessor, a microcontroller, an application-specific integrated circuit (ASIC), a field-programmable gate array (FPGA), a field-programmable object array (FPOA), or a programmable logic device (PLD). The at least one processor 110 described above may include or function with software programs, firmware or other computer readable instructions for carrying out various methods, process tasks, calculations, and control functions, described herein. In exemplary embodiments, the processing unit 108 is configured to execute any of the methods described herein with respect to FIGS. 2-5.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

In exemplary embodiments, the processing unit 108 can be any module that manages data communications for the aircraft 100. The data communications may include, but are not limited to, ATC messages and AOC messages. In exemplary embodiments, the processing unit 108 can be commutatively coupled to other systems of the aircraft 100. For example, the processing unit 108 may be communicatively coupled to the Flight Management System (FMS), a user interface, or other system. In some embodiments, the processing unit 108 comprises a Communications Management Unit (CMU). In other embodiments, the processing unit 108 is a generic platform with one or more modules having a communication management function (CMF). In other embodiments, the processing unit 108 comprises an Air Traffic Service Unit (ATSU). In exemplary embodiments, the processing unit 108 or its functionality is incorporated into one of the transceivers 104. In exemplary embodiments, the processing unit 108 establishes a primary air-to-ground data communication link 103, using a single transceiver 104, for data communications at a given time during operation.

The primary air-to-ground data communication link is the data communication link used for transmitting and receiving data link messages for the aircraft. In exemplary embodiments, establishing a data communication link 103 includes establishing both a physical connection (between the transceiver 104 and the ground station 101) and a logical connection (between the processing unit 108 and the ground station 101). In some embodiments, a data communication link 103 is established according to the requirements of the VHF data link (VDL) mode 2 protocol or another data link protocol known to one having skill in the art.

In an example embodiment of operation, the processing unit 108 establishes a first air-to-ground data communication link 103-1 with transceiver 104-1 and ground station 101-1 using a first frequency. The processing unit 108 tunes transceiver 104-1 to the first frequency and establishes the data communication link 103-1 by sending a contact message to ground station 101-1 and receiving a response from ground station 101-1. In exemplary embodiments, the contact message is an ACARS Q0 message, a downlink data link communication message, or the like. The processing unit 108 also establishes a second air-to-ground data communication link 103-2 with transceiver 104-2 and ground station 101-2 using a second frequency.

In exemplary embodiments, the second air-to-ground data communication link 103-2 is established after it is determined that a handoff from the first frequency to a different frequency is needed. In alternative embodiments, the second air-to-ground data communication link 103-2 is established before it is determined that a handoff from the first frequency to a different frequency is needed. In some alternative embodiments, the processing unit 108 attempts to maintain both air-to-ground data communication links 103, using various frequencies, at all times. In other alternative embodiments, the processing unit 108 attempts to reduce or minimize the amount of time when both air-to-ground data communication links 103 are established while also establishing the second data communication link before it is determined that a handoff from the first frequency to a different frequency is needed. In such embodiments, the processing unit 108 determines when to establish the second air-to-ground data communication link 103-2 based on a plurality of factors, including, but not limited to, the position of the aircraft 100, signal quality, and a learning-based algorithm. In exemplary embodiments, thresholds for determining when to establish the second air-to-ground data communication link 103-2 are selected to be met prior to a threshold for determining when a handoff is needed.

In exemplary embodiments, determining that a handoff is needed includes detecting a disruption in the first air-to-ground data communication link. In such embodiments, the determination may include detecting a signal to noise ratio below a selected threshold, detecting a lapse in response for a selected period of time, or other techniques known to one having skill in the art.

In exemplary embodiments, determining that a handoff is needed includes receiving a handoff command from the first ground station and accepting the command. In such embodiments, the communication system 102, crew, or another aircraft system evaluates the handoff command to determine whether the command will be accepted or rejected. If rejected, the communication system 102 may send a downlink message notifying the ground station from which the handoff command was received that a handoff will not be performed.

In exemplary embodiments, determining that a handoff is needed includes detecting a higher signal quality between the second transceiver and the second ground station than between the first transceiver and the first ground station. In exemplary embodiments, determining that a handoff is needed includes determining that the aircraft is within a threshold distance of the second ground station. In exemplary embodiments, determining that a handoff is needed includes using a learning based algorithm that considers past data for aircraft in the data region.

After determining that a handoff is needed, the communication system 102 executes a handoff from the first frequency to the second frequency. In exemplary embodiments, once the second air-to-ground data communication link 103-2 is successfully established, the communication system 102 switches the second air-to-ground data communication link 103-2 to the primary data communication link. In exemplary embodiments, the communication system 102 executes a soft handoff. In exemplary embodiments, a soft handoff is where the communication system 102 establishes separate air-to-ground data communication links on two different frequencies when changing frequencies for the primary data communication link. A soft handoff is also referred to as a "make-before-break" handoff. This type of handoff limits the amount of zero communication time (no contact with a ground station) experienced by the aircraft. In such embodiments, the first air-to-ground data communication link 103-1 is maintained at least until the second air-to-ground data communication link 103-2 is successfully established and switched to be the primary data communication link. After switching, the first air-to-ground data communication is affirmatively disconnected or otherwise allowed to disconnect (for example, disconnecting when out of range).

In exemplary embodiments, the memory 112 includes data region boundary information 114 and data region frequency information 116 for a plurality of data regions. A data region can comprise a geographic area and the data region boundary information 114 includes geographical boundaries of the data regions. The data region frequency information 116 includes a list of preferred frequencies for data communications within the data region. The data region frequency information 116 can be airline specific as different airlines can contract with different service providers for datalink communications. In exemplary embodiments, the data region boundary information 114 and the data region frequency information 116 are loaded into the memory 112 pre-flight and the information is static during operation. In exemplary embodiments, the data region boundary information 114 and the data region frequency information 116 may be stored in a database. In exemplary embodiments, the aircraft 100 may receive updates to the information 114, 116 during operation via a data communication uplink from a ground station 101.

In exemplary embodiments, the aircraft 100 also includes at least one optional position sensor 118, which may include, but is not limited to, a Global Navigation Satellite System (GNSS) receiver, an inertial navigation system (INS), or the like. In such embodiments, the processing unit 108 may use position information obtained from the at least one optional position sensor 118 and the data region boundary information 114 to determine which data region the aircraft 100 is positioned within.

In example embodiments of operation, the aircraft 100 will travel through a plurality of data regions, and the communication system 102 will have to switch frequencies when leaving one data region and entering the next data region. Accordingly, when it is determined that the aircraft 100 is within a threshold range of the next data region, the communication system 102 initiates a handover or handoff procedure. In exemplary embodiments, the communication system 102 identifies a preferred frequency for the next data region from the data region frequency information 116 and determines whether it is the same as the first frequency used for the first air-to-ground data communication link 103-1 for the current data region. If so, the communication system 102 determines whether there are other preferred frequencies for the next data region. If the identified frequency is not the same as the first frequency, then the communication system 102 establishes the second air-to-ground data communication link 103-2 with the transceiver 104-2 and the second ground station 101-2 using the identified frequency. If the second air-to-ground data communication link 103-2 is established using the first preferred frequency of the next data region (i.e., the identified frequency is the first preferred frequency), then that second air-to-ground data communication link is maintained when the aircraft enters the next data region. If not, the first air-to-ground data communication link is established using the first preferred frequency of the next data region when the aircraft enters the next data region.

Figure 2:
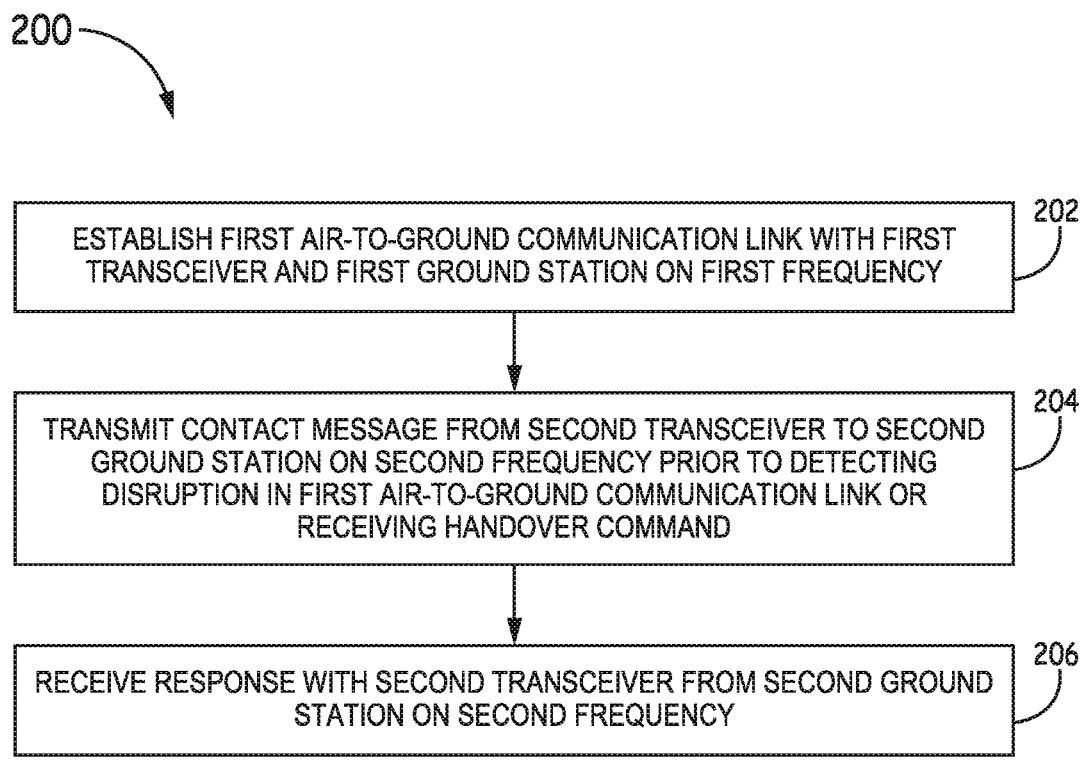
FIG. 2 is a flow chart illustrating an example method 200 of managing air-to-ground data communications according to one embodiment of the present disclosure.

FIG. 2 is a flow diagram illustrating an example method 200 of managing air-to-ground data communications according to one embodiment of the present disclosure. The functions, structures, and other description of elements for such embodiments described herein may apply to like named elements of method 200 and vice versa.

The method begins with establishing a first air-to-ground data communication link (such as link 103-1) with a first transceiver (such as transceiver 104-1) and a first ground station (such as ground station 101-1) using a first frequency (block 202). In exemplary embodiments, establishing the first air-to-ground data communication link includes transmitting a contact message to the first ground station with the first transceiver and receiving a response from the first ground station with the first transceiver. In exemplary embodiments, the contact message includes a Q0 message, a downlink datalink message, or the like. In exemplary embodiments, the first transceiver is configured to use multiple frequencies. When the first air-to-ground data communication link is established, it is the primary data communication link for the aircraft. In other words, the communication system 102 will exchange uplink and downlink messages with the first ground station using the first air-to-ground data communication link.

The method proceeds with transmitting a contact message from a second transceiver (such as transceiver 104-2) to a second ground station (such as ground station 101-2) using a second frequency (block 204). In exemplary embodiments, the second transceiver is configured to use multiple frequencies. In exemplary embodiments, the second frequency is different than the first frequency. The communication system transmits the contact message from the second transceiver before any determination that a handoff from the first frequency to a different frequency is needed. In exemplary embodiments, the contact message includes a Q0 message, a downlink datalink message, or the like.

The method proceeds with receiving a response message with the second transceiver from the second ground station using the second frequency (block 206). Upon receiving the response message, the second air-to-ground data communication link is established with the second transceiver and the second ground station. In exemplary embodiments, the second data communication link remains idle until it is determined that a handoff is needed. In exemplary embodiments, the response message is received before any determination that a handoff from the first frequency to a different frequency is needed.

Figure 3:
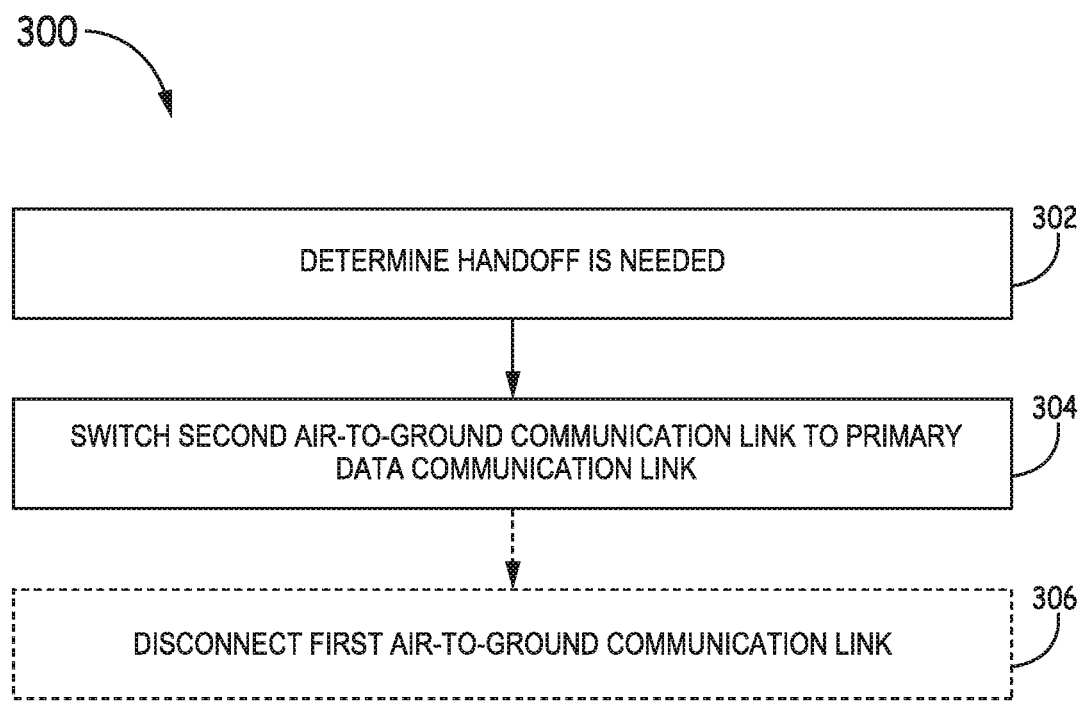
FIG. 3 is a flow chart illustrating an example method 300 of managing a soft handoff for air-to-ground data communication according to one embodiment of the present disclosure.

FIG. 3 is a flow diagram illustrating an example method 300 of managing a soft handoff for air-to-ground data communications according to one embodiment of the present disclosure. In exemplary embodiments, method 300 follows method 200 described above with respect to FIG. 2. The functions, structures, and other description of elements for such embodiments described herein may apply to like named elements of method 300 and vice versa.

The method begins with determining that a handoff from the first frequency to the second frequency is needed (block 302). In exemplary embodiments, determining that a handoff is needed includes detecting a disruption in the first air-to-ground data communication link. In such embodiments, the determination may include detecting a signal to noise ratio below a selected threshold, detecting a lapse in response for a selected period of time, or using other techniques known to one having skill in the art. In exemplary embodiments, determining that a handoff is needed includes receiving a handoff command from the first ground station and accepting the command. In such embodiments, the communication system, crew, or another aircraft system evaluates the handoff command to determine whether the command will be accepted or rejected. In exemplary embodiments, determining that a handoff is needed includes detecting a higher signal quality between the second transceiver and the second ground station than between the first transceiver and the first ground station. In exemplary embodiments, determining that a handoff is needed includes determining that the aircraft is within a threshold distance of the second ground station. In some embodiments, determining that a handoff is needed includes using a learning based algorithm that considers past data for aircraft in the data region.

The method proceeds with switching the second air-to-ground data communication link to be the primary data communication link (block 304). In exemplary embodiments, even if a disruption degrades the physical connection between the first transceiver and the first ground station, the logical connection between communication system and the ground station will be maintained until the second air-to-ground data communication link is established and switched to be the primary data communication link.

After the second air-to-ground data communication link has been established and switched to be the primary data communication link, the method optionally proceeds with disconnecting the first air-to-ground data communication link (block 306). In exemplary embodiments, the communication system will maintain the first air-to-ground data communication link if the communication system cannot establish the second air-to-ground data communication link.

Figure 4:
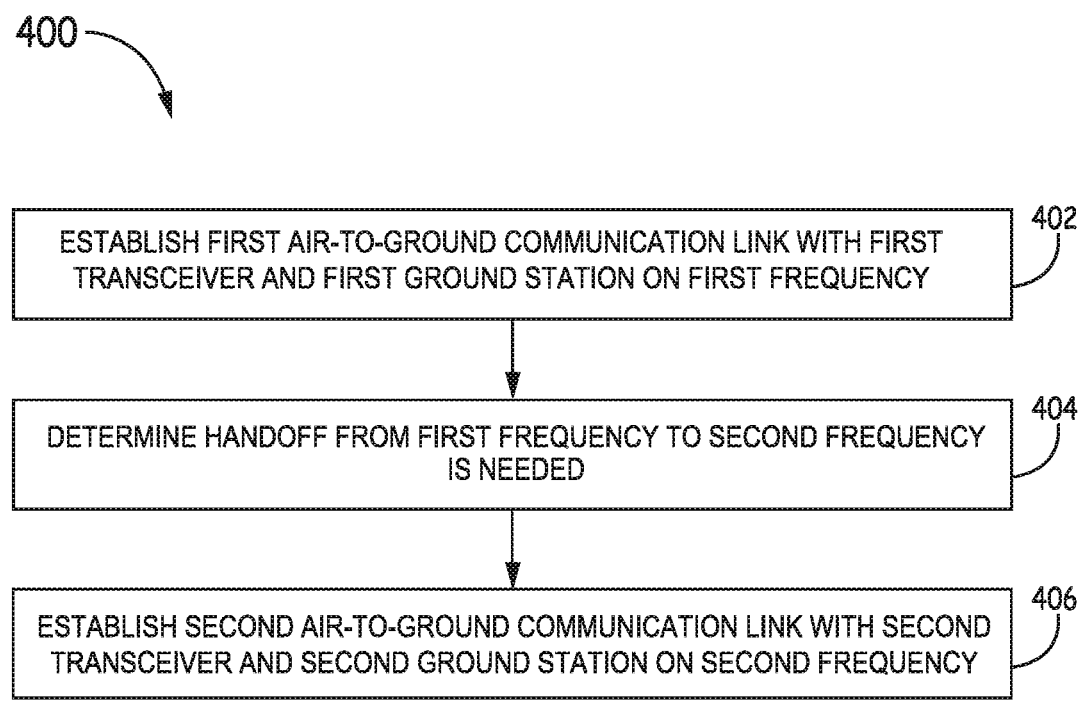
FIG. 4 is a flow chart illustrating an example method 400 of managing air-to-ground data communications according to one embodiment of the present disclosure.

FIG. 4 is a flow diagram illustrating an example method 400 of managing air-to-ground data communications according to one embodiment of the present disclosure. The functions, structures, and other description of elements for such embodiments described herein may apply to like named elements of method 400 and vice versa.

The method begins with establishing a first air-to-ground data communication link (such as link 103-1) with a first transceiver (such as transceiver 104-1) and a first ground station (such as ground station 101-1) using a first frequency (block 402). In exemplary embodiments, the establishment of the first air-to-ground data communication link is similar to that described above with respect to block 202 of FIG. 2.

The method proceeds with determining that a handoff from the first frequency to a second frequency is needed (block 404). In exemplary embodiments, the second frequency is different than the first frequency. In exemplary embodiments, the determination is similar to that described above with respect to block 302 of FIG. 3.

After the determination is made, the method proceeds with establishing a second air-to-ground data communication link (such as link 103-2) with the second transceiver (such as transceiver 104-2) and the second ground station (such as ground station 101-2) using the second frequency (block 406). In exemplary embodiments, the establishment of the first air-to-ground data communication link is similar to that described above with respect to blocks 204 and 206 of FIG. 2. In exemplary embodiments, the first air-to-ground data communication link is maintained until the second air-to-ground data communication link is successfully established.

Figure 5:
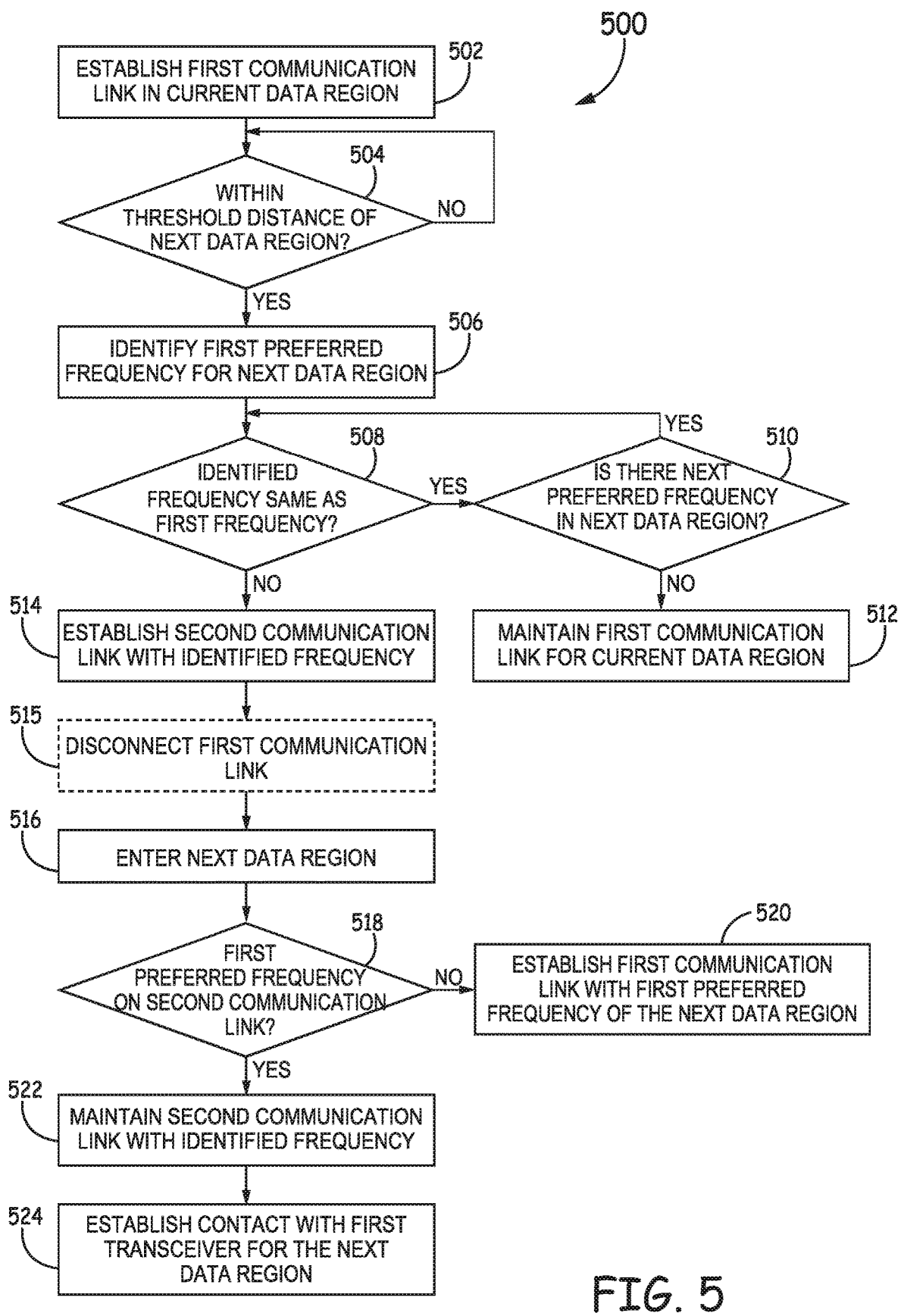
FIG. 5 is a flow chart illustrating an example method 500 of managing air-to-ground data communications according to one embodiment of the present disclosure.

FIG. 5 is a flow diagram illustrating an example method 500 of managing data communications according to one embodiment of the present disclosure. The functions, structures, and other description of elements for such embodiments described herein may apply to like named element of method 500 and vice versa.

The method begins with establishing a first data communication link (such as link 103-1) for a current data region occupied by the aircraft (such as aircraft 100) (block 502). In exemplary embodiments, the first data communication link is established with a first transceiver (such as transceiver 104-1) and a first ground station (such as ground station 101-1) using a first frequency. In exemplary embodiments, a second data communication link is also established with a second transceiver (such as transceiver 104-2) and a second ground station (such as 101-2) using a second frequency as described above with respect to blocks 204 and 206.

The method proceeds with determining whether the aircraft is within a threshold range of the next data region (block 504). In exemplary embodiments, the determination is made by comparing the current position of the aircraft to data region boundary information, which includes the geographical boundaries of the data region. The threshold range is determined based on the amount of time required to execute a handoff, the amount of time to establish a communication link, and the airspeed of the aircraft. In exemplary embodiments, the threshold range is approximately 20 kilometers.

When the aircraft is not within the threshold range of the next data region, the method repeats block 504. When the aircraft is within the threshold range of the next data region, the method proceeds with identifying a first preferred frequency for the next data region (block 506). In exemplary embodiments, the first preferred frequency is identified from a list contained in data region frequency information on a memory of the communication system. The data region frequency information includes an ordered list of preferred frequencies for each data region.

The method proceeds with determining whether the identified frequency is the same frequency as the first frequency used for the first data communication link (block 508). In exemplary embodiments, this determination is made by comparing the identified frequency to the first frequency used for the first data communication link in the current data region occupied by the aircraft.

When the identified frequency is the same frequency as the first frequency used for the first data communication link in the current data region, the method proceeds with determining whether a there is a next preferred frequency for the next data region (block 510). When there is a next preferred frequency for the next data region, the method repeats block 508 for the next preferred frequency. When there is not a next preferred frequency (i.e., there are no overlapping frequencies between the current data region and the next data region), the method proceeds with maintaining the first communication link for the current data region (block 512). In exemplary embodiments, contact is maintained between the second transceiver and the second ground station using the second frequency.

When the identified frequency is not the same frequency as the first frequency used for the first data communication link in the current data region, the method proceeds with establishing the second data communication link with the second transceiver and the second ground station using the identified frequency (block 514). In exemplary embodiments, when the second data communication link is established using the identified frequency, the method optionally includes disconnecting the first data communication link (block 515).

The method proceeds when the aircraft enters the next data region (block 516) with determining whether the second communication link has been established using the first preferred frequency for the next data region (block 518). In exemplary embodiments, the communication system determines whether the second transceiver is tuned to the first preferred frequency for the next data region.

When the second communication link is not using the first preferred frequency, the method proceeds with establishing the first communication link with the first transceiver and a ground station using the first preferred frequency of the next data region (block 520). In exemplary embodiments, the first communication link is established with the same ground station as the second communication link. In other embodiments, the first and second communication links are established with different ground stations.

When the second communication link is using the first preferred frequency, the method proceeds with maintaining the second communication link using the identified frequency (block 522) and establishing contact between the first transceiver and a ground station using the next preferred frequency for the next region.

By using two or more transceivers to establish air-to-ground data communication links, the systems and methods described herein provide more efficient handoffs and reduce the likelihood of lost messages when changing frequencies. In particular, the systems and methods described herein enable soft handoffs when changing the frequency of the air-to-ground data communication link. Further, by establishing the second air-to-ground data communication link between a second ground station and the second transceiver prior to determining that a handoff is needed efficiency of handoffs can be increased even further.

Also, when the transceivers are capable of performing voice and data communications, two transceivers can be used to facilitate the soft handover for air-to-ground data communications and then one of the transceivers can return to functioning as a backup transceiver for voice communications. This enables a reduction in the number of transceivers required on the aircraft.

Example Embodiments

Example 1 includes a communication system onboard an aircraft, comprising: a first multi-frequency transceiver coupled to a first antenna; a second multi-frequency transceiver coupled to a second antenna; and at least one processor communicatively coupled to a memory, the first multi-frequency transceiver, the second multi-frequency transceiver; wherein the at least one processor is configured to: establish a first air-to-ground data communication link with the first multi-frequency transceiver and a first ground station using a first frequency, wherein the first air-to-ground data communication link is a primary data communication link for the aircraft; and before determining that a handoff is needed, establish a second air-to-ground data communication link with the second multi-frequency transceiver and a second ground station using a second frequency, wherein the second frequency is different from the first frequency, by: transmitting a contact message from the second multi-frequency transceiver to the second ground station using the second frequency; and receiving a response with the second multi-frequency transceiver from the second ground station using the second frequency.

Example 2 includes the system of Example 1, wherein the first antenna and the second antenna comprise a common antenna.

Example 3 includes the system of any of Examples 1-2, wherein the first multi-frequency transceiver and the second multi-frequency transceiver each comprise a very-high frequency (VHF) data radio.

Example 4 includes the system of any of Examples 1-3, wherein the contact message is one of: a Q0 message; and a datalink message.

Example 5 includes the system of any of Examples 1-4, wherein determining that a handoff is needed includes at least one of: detecting a disruption in the first air-to-ground data communication link; receiving a handoff command from the first ground station; detecting a higher signal quality between the second transceiver and the second ground station than between the first transceiver and the first ground station; and determining that the aircraft is within a threshold distance of the second ground station.

Example 6 includes the system of Example 5, wherein, the at least one processor is further configured to: switch the primary data communication link to the second air-to-ground data communication link after determining that a handoff is needed, wherein the first air-to-ground data communication link is maintained until the switch is successfully completed.

Example 7 includes the system of any of Examples 1-6, wherein the memory includes data region boundary information for a plurality of data regions and data region frequency information for the plurality of data regions, wherein the at least one processor is further configured to: determine which of the plurality of data regions the aircraft is currently positioned within using position information from at least one position sensor on the aircraft and the data region boundary information; determine when the aircraft is within a threshold range of a second data region using the position information from the at least one position sensor on the aircraft and the data region boundary information; and select the second frequency from the data region frequency information for the plurality of data regions.

Example 8 includes the system of any of Examples 1-7, wherein the at least one processor communicatively coupled to a memory is incorporated into one of: a Communication Management Unit (CMU) resident on the aircraft; a Communications Management Function (CMF) resident on the aircraft; and an Air Traffic Service Unit (ATSU) resident on the aircraft.

Example 9 includes the system of any of Examples 1-8, wherein the aircraft comprises one of: an airplane; a helicopter; and a spacecraft.

Example 10 includes a method of air-to-ground communication, comprising: establishing a first air-to-ground data communication link with a first multi-frequency transceiver and a first ground station using a first frequency, wherein the first air-to-ground data communication link is a primary data communication link for the aircraft; and before determining that a handoff is needed, establishing a second air-to-ground data communication link with a second multi-frequency transceiver and a second ground station using a second frequency, wherein the second frequency is different from the first frequency, by: transmitting a contact message from a second multi-frequency transceiver to the second ground station on the second frequency; and receiving a response with the second multi-frequency transceiver from the second ground station on the second frequency.

Example 11 includes the method of Example 10, wherein determining that a handoff is needed includes at least one of: detecting a disruption in the first air-to-ground data communication link; receiving a handoff command from the first ground station; detecting a higher signal quality between the second transceiver and the second ground station than between the first transceiver and the first ground station; and determining that the aircraft is within a threshold distance of the second ground station.

Example 12 includes the method of Example 11, further comprising: after determining that a handoff is needed, switching the primary data communication link for the aircraft to the second air-to-ground data communication link, wherein the first air-to-ground data communication link is maintained until the switching is successfully completed.

Example 13 includes a communication system onboard an aircraft, comprising: a first multi-frequency transceiver coupled to a first antenna; a second multi-frequency transceiver coupled to a second antenna; and at least one processor communicatively coupled to a memory, the first multi-frequency transceiver, and the second multi-frequency transceiver; wherein the at least one processor is configured to: establish a first air-to-ground data communication link with the first multi-frequency transceiver and a first ground station using a first frequency; determine that a handoff from the first frequency to a second frequency is needed, wherein the second frequency is different from the first frequency; and establish a second air-to-ground data communication link with the second multi-frequency transceiver and a second ground station using a second frequency, wherein the first air-to-ground data communication link is maintained until the second air-to-ground data communication link is successfully established.

Example 14 includes the system of Example 13, wherein determine that a handoff from the first frequency to the second frequency is needed includes at least one of: detecting a disruption in the first air-to-ground data communication link; receiving a handoff command from the first ground station; detecting a higher signal quality between the second transceiver and the second ground station than between the first transceiver and the first ground station; and determining that the aircraft is within a threshold distance of the second ground station.

Example 15 includes the system of any of Examples 13-14, wherein the memory includes data region boundary information for a plurality of data regions and data region frequency information for the plurality of data regions, wherein the at least one processor is further configured to: determine which of the plurality of data regions the aircraft is currently positioned within using position information from at least one position sensor on the aircraft and the data region boundary information; determine when the aircraft is within a threshold range of a second data region using the position information from the at least one position sensor on the aircraft and the data region boundary information; and select the second frequency from the data region frequency information for the plurality of data regions.

Example 16 includes the system of any of Examples 13-15, wherein the at least one processor communicatively coupled to a memory is incorporated into one of: a Communication Management Unit (CMU) resident on the aircraft; a Communications Management Function (CMF) resident on the aircraft; and an Air Traffic Service Unit (ATSU) resident on the aircraft.

Example 17 includes the system of any of Examples 13-16, wherein the aircraft comprises one of: an airplane; a helicopter; and a spacecraft.

Example 18 includes a method of air-to-ground communication, comprising: establishing a first air-to-ground data communication link with a first multi-frequency transceiver and a first ground station using a first frequency; and determining that a handoff from the first frequency to a second frequency is needed, wherein the second frequency is different from the first frequency; establishing a second air-to-ground data communication link with a second multi-frequency transceiver and a second ground station using a second frequency, wherein the first air-to-ground data communication link is maintained until the second air-to-ground data communication link is successfully established.

Example 19 includes the method of Example 18, wherein determining that a handoff is needed includes at least one of: detecting a disruption in the first air-to-ground data communication link; receiving a handoff command from the first ground station; detecting a higher signal quality between the second transceiver and the second ground station than between the first transceiver and the first ground station; and determining that the aircraft is within a threshold distance of the second ground station.

Example 20 includes the method of any of Examples 18-19, further comprising: determining when the aircraft is positioned within a first data region using position information from at least one position sensor and data region boundary information for a plurality of data regions; determining when the aircraft is within a threshold range of a second data region using position information from the at least one position sensor and data region boundary information for the plurality of data regions; selecting the second frequency from data region frequency information for the plurality of data regions; and switching to the second air-to-ground data communication link.

Example 21 includes the method of Example 20, wherein selecting the second frequency further comprises: identifying a first preferred frequency for the second data region; determining whether the first preferred frequency for the second data region is a same frequency as the first frequency used for the first air-to-ground data communication link; and when the first preferred frequency for the second data region is not the same frequency as the first frequency used for the first air-to-ground data communication link, establishing the second air-to-ground data communication link with the second multi-frequency transceiver and the second ground station using the first preferred frequency for the second data region.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A communication system onboard an aircraft, comprising:
    a first multi-frequency transceiver coupled to a first antenna;
    a second multi-frequency transceiver coupled to a second antenna; and
    at least one processor communicatively coupled to a memory, the first multi-frequency transceiver, and the second multi-frequency transceiver;
    wherein the at least one processor is configured to:
        establish a first air-to-ground data communication link with the first multi-frequency transceiver and a first ground station using a first frequency, wherein the first air-to-ground data communication link comprises both a first physical connection between the first multi-frequency transceiver and the first ground station and a first logical connection between the at least one processor and the first ground station, wherein the first air-to-ground data communication link is a primary data communication link for the aircraft; and
        before determining that a handoff is needed, establish a second air-to-ground data communication link with the second multi-frequency transceiver and a second ground station using a second frequency, wherein the second air-to-ground data communication link comprises both a second physical connection between the second multi-frequency transceiver and the second ground station and a second logical connection between the at least one processor and the second ground station, wherein the second frequency is different from the first frequency, by:
            transmitting a contact message from the second multi-frequency transceiver to the second ground station using the second frequency; and
            receiving a response with the second multi-frequency transceiver from the second ground station using the second frequency.

2. The system of claim 1, wherein the first antenna and the second antenna comprise a common antenna.

3. The system of claim 1, wherein the first multi-frequency transceiver and the second multi-frequency transceiver each comprise a very-high frequency (VHF) data radio.

4. The system of claim 1, wherein the contact message is one of:
    a Q0 message; and
    a datalink message.

5. The system of claim 1, wherein determining that a handoff is needed includes at least one of:
    detecting a disruption in the first air-to-ground data communication link;
    receiving a handoff command from the first ground station;
    detecting a higher signal quality between the second multi-frequency transceiver and the second ground station than between the first multi-frequency transceiver and the first ground station; and
    determining that the aircraft is within a threshold distance of the second ground station.

6. The system of claim 5, wherein, the at least one processor is further configured to:
    switch the primary data communication link to the second air-to-ground data communication link after determining that a handoff is needed, wherein the first air-to-ground data communication link is maintained until the switch is successfully completed.

7. The system of claim 1, wherein the memory includes data region boundary information for a plurality of data regions and data region frequency information for the plurality of data regions, wherein the at least one processor is further configured to:
    determine which of the plurality of data regions the aircraft is currently positioned within using position information from at least one position sensor on the aircraft and the data region boundary information;
    determine when the aircraft is within a threshold range of a second data region using the position information from the at least one position sensor on the aircraft and the data region boundary information; and
    select the second frequency from the data region frequency information for the plurality of data regions.

8. The system of claim 1, wherein the at least one processor communicatively coupled to a memory is incorporated into one of:
    a Communication Management Unit (CMU) resident on the aircraft;
    a Communications Management Function (CMF) resident on the aircraft; and
    an Air Traffic Service Unit (ATSU) resident on the aircraft.

9. The system of claim 1, wherein the aircraft comprises one of:
    an airplane;
    a helicopter; and
    a spacecraft.

10. A method of air-to-ground communication, comprising:
    establishing a first air-to-ground data communication link with a first multi-frequency transceiver and a first ground station using a first frequency, wherein the first air-to-ground data communication link comprises both a first physical connection between the first multi-frequency transceiver and the first ground station and a first logical connection between at least one processor and the first ground station, wherein the first air-to-ground data communication link is a primary data communication link for the aircraft; and
    before determining that a handoff is needed, establishing a second air-to-ground data communication link with a second multi-frequency transceiver and a second ground station using a second frequency, wherein the second air-to-ground data communication link comprises both a second physical connection between the second multi-frequency transceiver and the second ground station and a second logical connection between the at least one processor and the second ground station, wherein the second frequency is different from the first frequency, by:
        transmitting a contact message from the second multi-frequency transceiver to the second ground station on the second frequency; and
        receiving a response with the second multi-frequency transceiver from the second ground station on the second frequency.

11. The method of claim 10, wherein determining that a handoff is needed includes at least one of:
    detecting a disruption in the first air-to-ground data communication link;

receiving a handoff command from the first ground station;

detecting a higher signal quality between the second multi-frequency transceiver and the second ground station than between the first multi-frequency transceiver and the first ground station; and determining that the aircraft is within a threshold distance of the second ground station.

12. The method of claim 11, further comprising:

after determining that a handoff is needed, switching the primary data communication link for the aircraft to the second air-to-ground data communication link, wherein the first air-to-ground data communication link is maintained until the switching is successfully completed.

13. A communication system onboard an aircraft, comprising:

a first multi-frequency transceiver coupled to a first antenna;

a second multi-frequency transceiver coupled to a second antenna; and at least one processor communicatively coupled to a memory, the first multi-frequency transceiver, and the second multi-frequency transceiver;

wherein the at least one processor is configured to:

establish a first air-to-ground data communication link with the first multi-frequency transceiver and a first ground station using a first frequency, wherein the first air-to-ground data communication link comprises both a first physical connection between the first multi-frequency transceiver and the first ground station and a first logical connection between the at least one processor and the first ground station;

determine that a handoff from the first frequency to a second frequency is needed, wherein the second frequency is different from the first frequency; and establish a second air-to-ground data communication link with the second multi-frequency transceiver and a second ground station using a second frequency, wherein the second air-to-ground data communication link comprises both a second physical connection between the second multi-frequency transceiver and the second ground station and a second logical connection between the at least one processor and the second ground station, wherein the first air-to-ground data communication link is maintained until the second air-to-ground data communication link is successfully established.

14. The system of claim 13, wherein determine that a handoff from the first frequency to the second frequency is needed includes at least one of:

detecting a disruption in the first air-to-ground data communication link;

receiving a handoff command from the first ground station;

detecting a higher signal quality between the second multi-frequency transceiver and the second ground station than between the first multi-frequency transceiver and the first ground station; and determining that the aircraft is within a threshold distance of the second ground station.

15. The system of claim 13, wherein the memory includes data region boundary information for a plurality of data regions and data region frequency information for the plurality of data regions, wherein the at least one processor is further configured to:

determine which of the plurality of data regions the aircraft is currently positioned within using position information from at least one position sensor on the aircraft and the data region boundary information;

determine when the aircraft is within a threshold range of a second data region using the position information from the at least one position sensor on the aircraft and the data region boundary information; and select the second frequency from the data region frequency information for the plurality of data regions.

16. The system of claim 13, wherein the at least one processor communicatively coupled to a memory is incorporated into one of:

a Communication Management Unit (CMU) resident on the aircraft;

a Communications Management Function (CMF) resident on the aircraft; and an Air Traffic Service Unit (ATSU) resident on the aircraft.

17. The system of claim 13, wherein the aircraft comprises one of:

an airplane;

a helicopter; and a spacecraft.

18. A method of air-to-ground communication, comprising:

establishing a first air-to-ground data communication link with a first multi-frequency transceiver and a first ground station using a first frequency, wherein the first air-to-ground data communication link comprises both a first physical connection between the first multi-frequency transceiver and the first ground station and a first logical connection between at least one processor and the first ground station; and determining that a handoff from the first frequency to a second frequency is needed, wherein the second frequency is different from the first frequency;

establishing a second air-to-ground data communication link with a second multi-frequency transceiver and a second ground station using a second frequency, wherein the second air-to-ground data communication link comprises both a second physical connection between the second multi-frequency transceiver and the second ground station and a second logical connection between the at least one processor and the second ground station, wherein the first air-to-ground data communication link is maintained until the second air-to-ground data communication link is successfully established.

19. The method of claim 18, wherein determining that a handoff is needed includes at least one of:

detecting a disruption in the first air-to-ground data communication link;

receiving a handoff command from the first ground station;

detecting a higher signal quality between the second multi-frequency transceiver and the second ground station than between the first multi-frequency transceiver and the first ground station; and determining that the aircraft is within a threshold distance of the second ground station.

20. The method of claim 18, further comprising:

determining when the aircraft is positioned within a first data region using position information from at least one position sensor and data region boundary information for a plurality of data regions;

determining when the aircraft is within a threshold range of a second data region using position information from the at least one position sensor and data region boundary information for the plurality of data regions;

selecting the second frequency from data region frequency information for the plurality of data regions; and switching to the second air-to-ground data communication link.

21. The method of claim 20, wherein selecting the second frequency further comprises:

identifying a first preferred frequency for the second data region;

determining whether the first preferred frequency for the second data region is a same frequency as the first frequency used for the first air-to-ground data communication link; and when the first preferred frequency for the second data region is not the same frequency as the first frequency used for the first air-to-ground data communication link, establishing the second air-to-ground data communication link with the second multi-frequency transceiver and the second ground station using the first preferred frequency for the second data region.

\* \* \* \* \*